Patented Apr. 3, 1945

2,372,924

UNITED STATES PATENT OFFICE 2,372,924

PROCESS FOR THE EMULSIFICATION OF TARS AND LIKE SUBSTANCES

Edwin Arnold, London, England, assignor to Woodall-Duckham (1920) Limited, London, England, a British company No Drawing. Application December 28, 1938, Serial No. 248,123. In Great Britain March 2, 1938

12 Claims. (Cl. 252—311.5)

This invention relates to an improvement in, or a modification of the process for the preparation of stable aqueous emulsions of road tars, pitch, bitumen and the like, described and claimed in United States Letters Patent No. 2,247,722 granted to William James Chadder, Henry Michael Spiers and Edwin Arnold on July 1, 1941, of which the present applicant is one of the joint inventors and patentees, which patent is hereinafter referred to as the "main patent."

The emulsions prepared by the various recipes of the main patent, though differing somewhat in their rate of breaking, belong in the main to the "slow-breaking" type of emulsion rather than to the "quick-breaking" type. For some purposes (for example, the coating of mineral aggregates with tar for road-surfacing compositions of the thin carpet type), slow-breaking emulsions are specially suitable; on the other hand, for surface application to roads etc. a relatively quick-breaking emulsion if often more suitable.

The present invention enables the effective and convenient two-stage process of the main patent to be employed for the production of emulsions having a more rapid rate of break than the emulsions prepared by the various recipes of the main patent, the rate of break being controllable at will within limits by varying the proportions of the emulsifying agents employed, as hereinafter described.

According to the present invention, in a process for the production of aqueous emulsions of road tars, pitch bitumen and the like, according to the process of the main patent the emulsifying agent employed for the preparation of the "water-in-oil" type of emulsion in the first stage of the process consists either of an alkaline solution containing farinaceous matter and an alkali or an alkaline salt, or a mixture of such an alkaline farinaceous solution and a solution of an alkaline alginate, and the emulsifying agent employed for the conversion of the "water-in-oil" type of emulsion into the desired "oil-in-water" type in the second stage of the process consists of an alkali-soluble protein and a small amount of free alkali to assist the solution of the protein, together with either an alkaline farinaceous solution similar to that of the first stage, or a mixture of such an alkaline farinaceous solution and an alkali alginate.

Other features of the present invention relate to the use of starch as the farinaceous matter; to the use of sodium alginate as the alkali alginate; and to the addition of a small quantity of formaldehyde to the alkaline farinaceous solution.

Further features of the present invention relate to the adjustment of the viscosity of the final emulsion by varying the amount of water incorporated in the first stage of the process; and to the control of the rate of breaking of the emulsion by varying the proportion of alkali alginate to farinaceous matter in the emulsifying agents employed in both the first and second stages of the process, as hereinafter described.

The alkali or alkaline salt used in conjunction with the farinaceous (i. e. starch) solution may be, for example, caustic soda or tri-basic sodium phosphate. When tri-sodium phosphate is used, experiments have shown that with some tars emulsions of adequate storage stability can be obtained by the use of a starch solution in both the first and second stages of the process without the addition of an alkali alginate, but if an alkali such as caustic soda is used, then experience has shown that it is often desirable, for the production of stable emulsions, to employ in the second stage of the process an emulsifying agent containing about four parts of alkaline starch solution and about one part of alkali alginate solution, in conjunction with an alkali-soluble protein (e. g. casein) as referred to above.

It has been found, however, that with some tars (among which are certain coke-oven tars) even if the alkaline starch solution is prepared with tri-sodium phosphate, it is necessary, in order to obtain emulsions having an adequate storage stability, to employ in the second stage of the process an emulsifying agent containing about four parts of alkaline starch solution and about one part of alkali alginate solution, together with casein as in the preceding paragraph. If therefore, on trial, any particular tar when emulsified by the process of the present invention with use of caustic soda or tri-sodium phosphate as the alkali for the preparation of the alkaline starch solution, does not give an emulsion of adequate stability by the use of starch solution and casein alone in the second stage of the process, the desired stability of the emulsion can be obtained by adding a proportion of sodium alginate solution to the emulsifying agent for the second stage of the process.

It has been found desirable to use sodium alginate solution which conforms to a certain specification, in order to secure a uniform product. This specification is as follows:

The material shall consist of an aqueous solution of sodium alginate. The concentration of total solids shall be 10% by weight with a tolerance of ±0.25%. The total alkalinity of the material shall be such that when a solution of 2 gms. of the material in 100 ccs. of distilled water is titrated against decinormal sulphuric acid with "bromophenol blue" as an indicator, the volume of acid required for neutralization shall be 16 ccs. with a tolerance of ±0.5 cc.

The following examples illustrate how the invention may be carried into practical effect.

EXAMPLE 1

*Preparation of starch solution*

To 20 lbs. of ordinary powdered maize starch as used for laundry work are added 2 to 8 lbs. of caustic soda, or 4 to 16 lbs. of tri-basic sodium phosphate (crystals containing 12 molecules of water), together with as much hot water (e. g. at 85° C.) as corresponds to about nine times the combined weight of starch and alkali. The mixture is stirred, brought to the boil and kept boiling until a slightly opalescent solution is obtained. 2 to 4 lbs. of 40% formaldehyde are then added.

*Preparation of emulsifying agent for use in the second stage*

25 lbs. of the above starch solution, 25 lbs. of alkali-soluble casein and 100 lbs. of hot water (e. g. at 85° C.) are mixed together and 1.9 lbs. of ammonia solution (Sp. Gr. 0.880) are added.

*Preparation of the invert ("water-in-oil" type emulsion*

20 lbs. of the starch solution, and between 70 and 170 lbs. of hot water (e. g. at 85° C.) are mixed with 1500 lbs. of hot road tar, in suitable stirring apparatus as described in the main patent. The mixture forms the invert emulsion. The amount of water is chosen according to the viscosity it is desired to obtain in the finished emulsion, as described hereinafter.

*Preparation of the revert ("oil-in-water" type) emulsion*

The invert, prepared as described in the preceding paragraph, is gradually introduced with stirring into the quantity of emulsifying agent for the second stage described above, which quantity is suitable for emulsifying 1500 lbs. of tar present as an invert emulsion. When the whole of the invert has been added and converted into the desired "oil-in-water" type emulsion, the appropriate amount of water is added to dilute the emulsion to the desired concentration.

The rate of break of the emulsions can be varied by using mixtures of emulsifying agents intermediate between the amounts specified in Example 1 above and the amounts employed in Example 3 of the main patent. The following example illustrates the use of such an intermediate mixture for the preparation of an emulsion having a less rapid break than that of Example 1.

EXAMPLE 2

*Preparation of the invert ("water-in-oil" type) emulsion*

10 lbs. of the starch solution of Example 1, 10 lbs. of a 10% sodium alignate solution conforming to the standard given above, and between 70 and 170 lbs. of hot water, (e. g. at 85° C.) are mixed with 1500 lbs. of hot road tar. The mixture forms the invert emulsion. The amount of water is chosen according to the viscosity it is desired to obtain in the finished emulsion, as referred to hereinafter.

*Preparation of the revert ("oil-in-water" type) emulsion*

The invert, prepared as described in the preceding paragraph, is gradually introduced while stirring, into an emulsifying agent made as described in Example 1, but consisting of 12½ lbs. of the starch solution of Example 1, 12½ lbs. of 10% sodium alginate solution, 25 lbs. of alkali-soluble casein, 100 lbs. of hot water and 1.9 lbs. of ammonia solution (Sp. Gr. 0.880), these quantities being suitable for emulsifying 1500 lbs. of tar present as an invert emulsion. When the whole of the invert has been added and converted into the desired "oil-in-water" type emulsion, the appropriate amount of water is added to dilute the emulsion to the desired concentration.

The following is an example in which the process is applied to a coke-oven tar of 80 seconds viscosity at 30° C., which required the presence of sodium alginate in the emulsifying agent in the second stage of the process to produce a quick-breaking emulsion of adequate storage stability.

EXAMPLE 3

*Preparation of the starch solution*

The starch used was ordinary powdered maize starch as used for laundry work. The alkali was in the form of tribasic sodium phosphate (crystals containing 12 molecules of water). A mixture of 6 lbs. of starch and 4 lbs. of tri-basic sodium phosphate is made into a paste with 10 lbs. of cold water. After addition of 70 lbs. of hot water, the mixture is brought to the boil and, at this stage, 120 ccs. of 40% formaldehyde are added.

*Prepaartion of emulifying agent for use in the revert stage*

20 lbs. of the starch solution of the preceding paragraph, 5 lbs. of 10% sodium alginate solution, conforming with the above specification, 25 lbs. of alkali-soluble casein and 100 lbs. of hot water at a temperature, for example, of 85° C., are mixed together and 1.9 lbs. of ammonia solution (Sp. Gr. 0.880) are added.

*Preparation of the invert ("water-in-oil" type) emulsion*

20 lbs. of the above starch solution, and 170 lbs. of hot water (e. g. at 85° C.) are mixed with 1500 lbs. of hot road tar. The mixture forms the invert emulsion.

*Preparation of the revert ("oil-in-water" type) emulsion*

The invert, prepared as described in the preceding paragraph, is gradually introduced while stirring, into the quantity of emulsifying agent for use in the revert stage referred to above, which is suitable for the emulsification of 1500 lbs. of tar present as an invert emulsion. When the whole of the invert has been added and converted into the desired "oil-in-water" type of emulsion, either 300 lbs. of water are added to produce an emulsion containing approximately 70% by weight of tar, or 465 lbs. of water are added to produce an emulsion containing approximately 65% by weight of tar.

It is also a feature of the present invention that the viscosity of the final emulsion can be controlled by varying the amount of water used in the first stage of the emulsification process (preparation of the invert emulsion), the viscosity of the final emulsion increasing as the amount of water used in the first stage is decreased. For example, when emulsifying on a laboratory scale, 1500 grams of tar to obtain a final emulsion containing 65% by weight of tar, by the process of Example 1 scaled down in the proportion of 1 lb. to 1 gram, of the present specification, the addition of 70 grams of water in the first stage (apart from the water contained in the alkaline starch solution) gives rise to a final emulsion approximately as viscous as an emulsion containing 65% of tar prepared with sodium alginate and casein as emulsifying agents according to Example 3 of the main patent. On the other hand, the addition of 170 grams of water in the first stage of Example 1 of the present specification permits the production of a final 65% tar emulsion approximately as fluid as an emulsion prepared according to Example 3 of the main patent but containing only 50-55% of tar. Similarly, by the addition of 170 grams of water in the first stage of the process of the present invention, a final emulsion may be prepared containing 75% by weight of tar, but which is approximately as fluid as an emulsion containing 65% of tar prepared according to Example 3 of the main patent.

It is accordingly an important advantage of the present invention that it enables quick-breaking, concentrated, yet highly fluid emulsions of tar to be prepared.

What I claim is:

1. Process for the preparation of stable aqueous emulsions of a bituminous material such as road tar, pitch and bitumen suitable for use on roads, characterized by this, that an inverted emulsion of the "water-in-oil" type is first prepared by mixing the bituminous material to be emulsified in the relative proportions of about 1500 pounds of said material with an aqueous emulsifying agent containing between about 70 and 170 pounds of water and about 20 pounds of an aqueous alkali-starch solution made by mixing an alkali selected from the group consisting of caustic soda and tri-basic sodium phosphate with starch and about 200 to 250 pounds of water when caustic soda is employed and from about 215 to 325 pounds of water when tri-basic sodium phosphate is employed; and this inverted emulsion is then added to and dispersed in an aqueous emulsifying agent containing about 100 pounds of water and about 25 pounds of the above referred to alkali-starch solution containing, in addition to the alkali and starch, about 25 pounds of an alkali-soluble casein, and an amount of free alkali sufficient to promote the solution of the casein, whereby the inverted emulsion is reverted into an emulsion of the "oil-in-water" type.

2. Process for the preparation of stable aqueous emulsions as claimed in claim 1, characterized in this, that the aqueous alkali-starch emulsion used in the first and second steps of the process defined in said claim has added thereto from about 2 to 4 pounds of 40% formaldehyde.

3. Process for the preparation of stable aqueous emulsions as claimed in claim 1, characterized in this, that the reverted emulsion is further diluted with water.

4. Process for the preparation of stable aqueous emulsions as claimed in claim 1, characterized in this, that the viscosity of the final emulsion is varied independently of the concentration thereof by adjusting the amount of water incorporated during the preparation of the inverted emulsion the proportion of water incorporated during preparation of said inverted emulsion being increased to decrease the viscosity of the final emulsion, and conversely.

5. Process for the preparation of stable aqueous emulsions of a bituminous material such as road tar, pitch and bitumen suitable for use on roads, characterized by this, that an inverted emulsion of the "water-in-oil" type is first prepared by mixing the bituminous material to be emulsified in the relative proportions of about 1500 pounds of said material with an aqueous emulsifying agent containing between about 70 and 170 pounds of water and about 20 pounds of an aqueous alkali-starch solution made by mixing caustic soda with starch and about 200 to 250 pounds of water; and this inverted emulsion is then added to and dispersed in an aqueous emulsifying agent containing about 100 pounds of water and about 25 pounds of the above referred to caustic soda-starch solution containing, in addition to the caustic soda and starch, about 25 pounds of an alkali-soluble casein, and an amount of free alkali sufficient to promote the solution of the casein, whereby the inverted emulsion is reverted into an emulsion of the "oil-in-water" type.

6. Process for the preparation of stable aqueous emulsions of a bituminous material such as road tar, pitch and bitumen suitable for use on roads, characterized by this, that an inverted emulsion of the "water-in-oil" type is first prepared by mixing the bituminous material to be emulsified in the relative proportions of about 1500 pounds of said material with an aqueous emulsifying agent containing between about 70 and 170 pounds of water and about 20 pounds of an aqueous alkali-starch solution made by mixing tri-basic sodium phosphate with starch and about 215 to 325 pounds of water; and this inverted emulsion is then added to and dispersed in an aqueous emulsifying agent containing about 100 pounds of water and about 25 pounds of the above referred to tri-basic sodium phosphate-starch solution containing, in addition to the tri-basic sodium phosphate and starch, about 25 pounds of an alkali-soluble casein and an amount of free alkali sufficient to promote the solution of the casein, whereby the inverted emulsion is reverted into an emulsion of the "oil-in-water" type.

7. Process for the preparation of stable aqueous emulsions of a bituminous material such as road tar, pitch and bitumen suitable for use on roads, characterized by this, that an inverted emulsion of the "water-in-oil" type is first prepared by mixing the bituminous material to be emulsified in the relative proportions of about 1500 pounds of said material with an aqueous emulsifying agent containing about 70 to 170 pounds of water, about 10 pounds of approximately 10% sodium alginate solution and about 10 pounds of an aqueous alkali-starch solution made by mixing an alkali selected from the group consisting of caustic soda and tri-basic sodium phosphate with starch and about 200 to 250 pounds of water when caustic soda is employed and from about 215 to 325 pounds of water when tri-basic sodium phosphate is employed; and this inverted emulsion is then added to and dispersed in an aqueous emulsifying agent containing about 100 pounds of water, about 12½ pounds of approximately 10% sodium alginate solution, about 12½ pounds of the above referred to alkali-starch solution containing, in addition to the alkali and starch, about 25 pounds of an alkali-soluble casein, and an amount of free alkali sufficient to promote the solution of the casein, whereby the inverted emulsion is reverted into an emulsion of the "oil-in-water" type.

8. Process for the preparation of stable aqueous emulsions as claimed in claim 7, characterized in this, that the reverted emulsion is further diluted with water.

9. Process for the preparation of stable aqueous emulsions as claimed in claim 7, characterized in this, that the rate of breaking of the final emulsion is decreased by increasing the proportions of sodium alginate to starch in the emulsifying agents used in the first and second steps of the process defined in said claim, and conversely.

10. Process for the preparation of stable aqueous emulsions of a bituminous material such as road tar, pitch and bitumen suitable for use on roads, characterized by this, that an inverted emulsion of the "water-in-oil" type is first prepared by mixing the bituminous material to be emulsified in the relative proportions of about 1500 pounds of said material with an aqueous emulsifying agent containing about 170 pounds of water and about 20 pounds of an aqueous alkali-starch solution made by mixing about 6 pounds of starch, about 4 pounds of tri-basic sodium phosphate and about 80 pounds of water; and this inverted emulsion is then added to and dispersed in an aqueous emulsifying agent containing about 100 pounds of water, about 20 pounds of the above referred to alkali-starch solution, about 5 pounds of approximately 10% sodium alginate solution, about 25 pounds of alkali-soluble casein, and an amount of free alkali sufficient to promote the solution of the casein, whereby the inverted emulsion is reverted into an emulsion of the "oil-in-water" type.

11. Process for the preparation of stable aqueous emulsions as claimed in claim 10, characterized by this, this the reverted emulsion is further diluted with water.

12. Process for the preparation of stable aqueous emulsions as claimed in claim 10, characterized by this, that the bituminous material is a coke-oven tar of about 80 seconds viscosity at about 30° C., and that the reverted emulsion is further diluted with from about 300 pounds of water to about 465 pounds of water to produce emulsions containing approximately 70% by weight of tar down to approximately 65% by weight of tar.

EDWIN ARNOLD.